Nov. 4, 1952  F. S. BOYER  2,616,306
CONTROL MECHANISM
Filed April 6, 1949  5 Sheets-Sheet 1
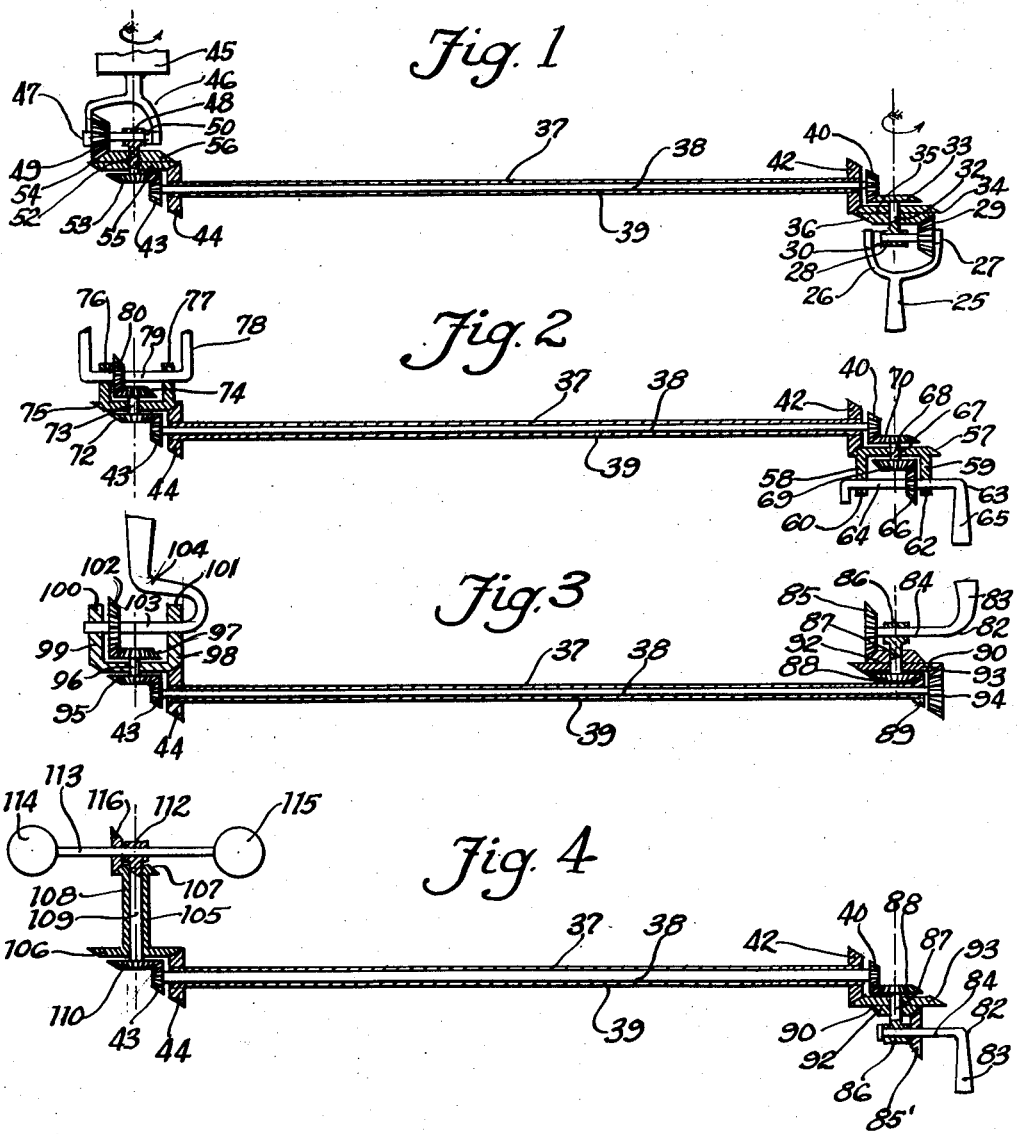
INVENTOR.
Fred S. Boyer
BY Albert G. McCaleb
Att'y

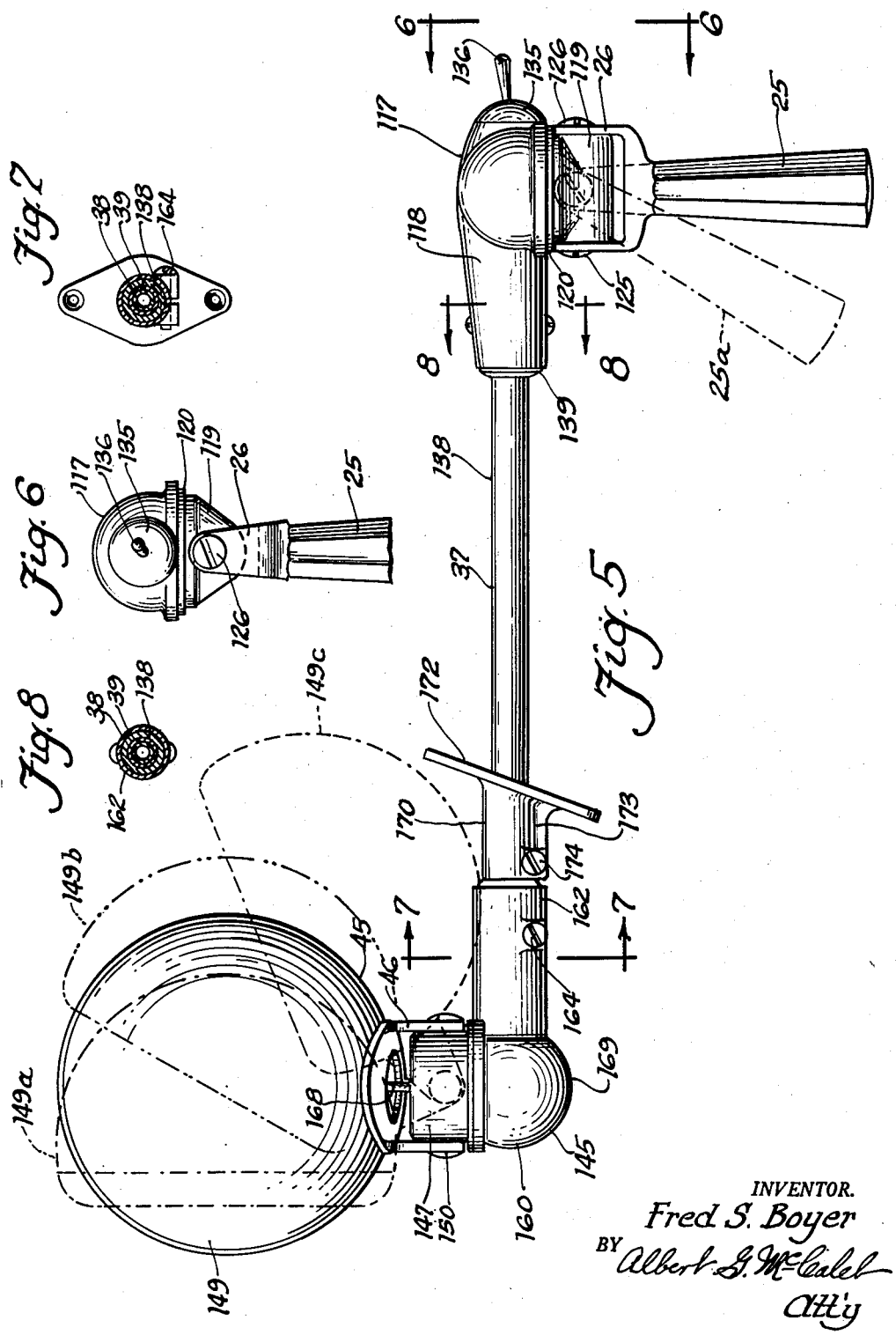

Nov. 4, 1952 — F. S. BOYER — 2,616,306
CONTROL MECHANISM
Filed April 6, 1949 — 5 Sheets-Sheet 3
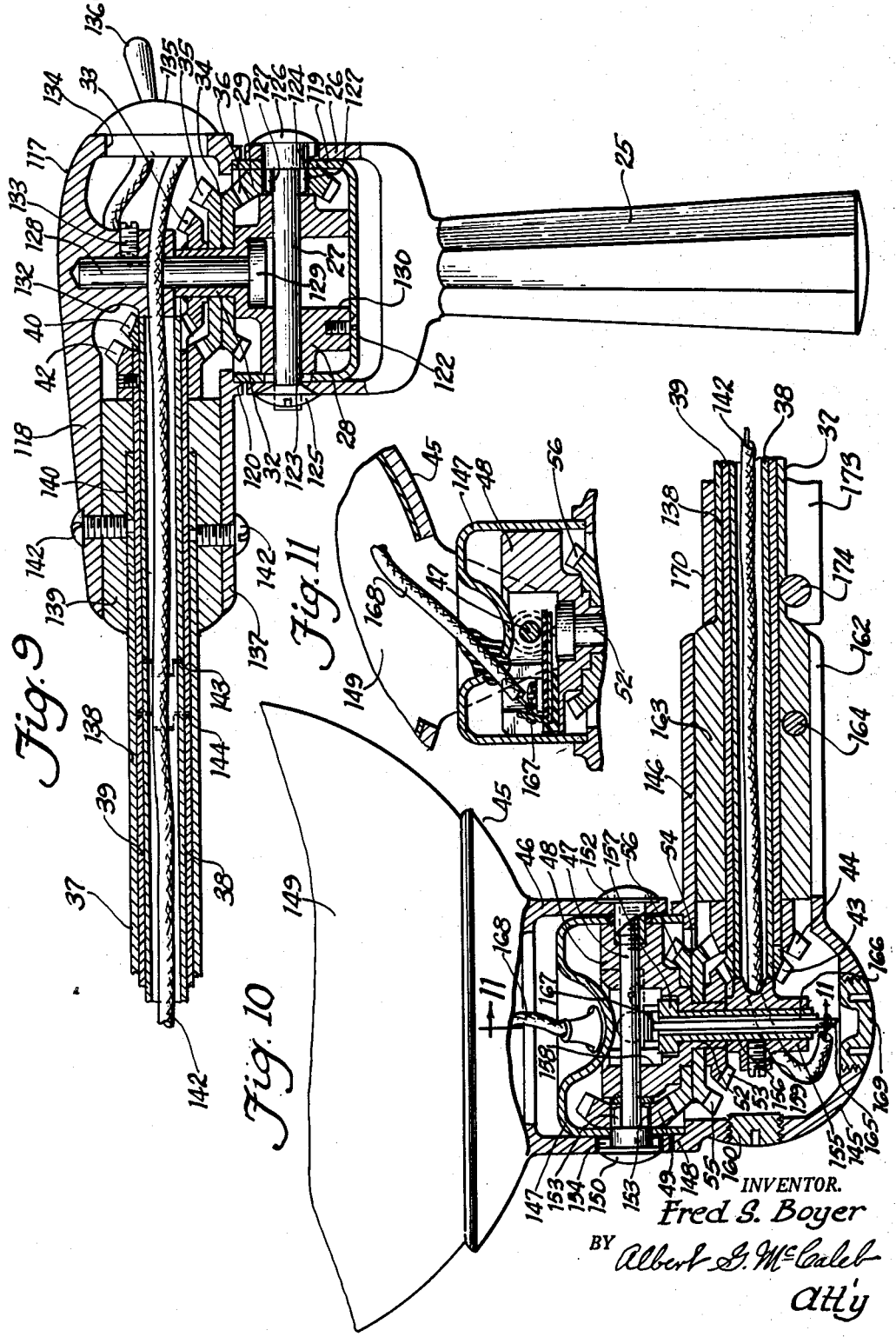
INVENTOR.
Fred S. Boyer
BY Albert G. McCaleb
Att'y Nov. 4, 1952 — F. S. BOYER — 2,616,306
CONTROL MECHANISM
Filed April 6, 1949 — 5 Sheets-Sheet 4
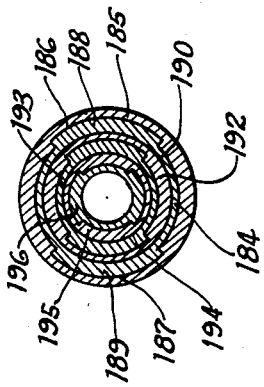
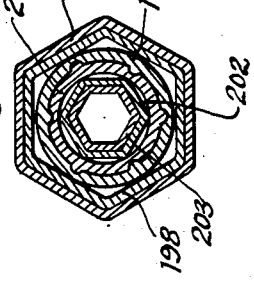
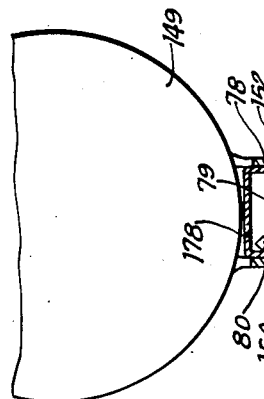
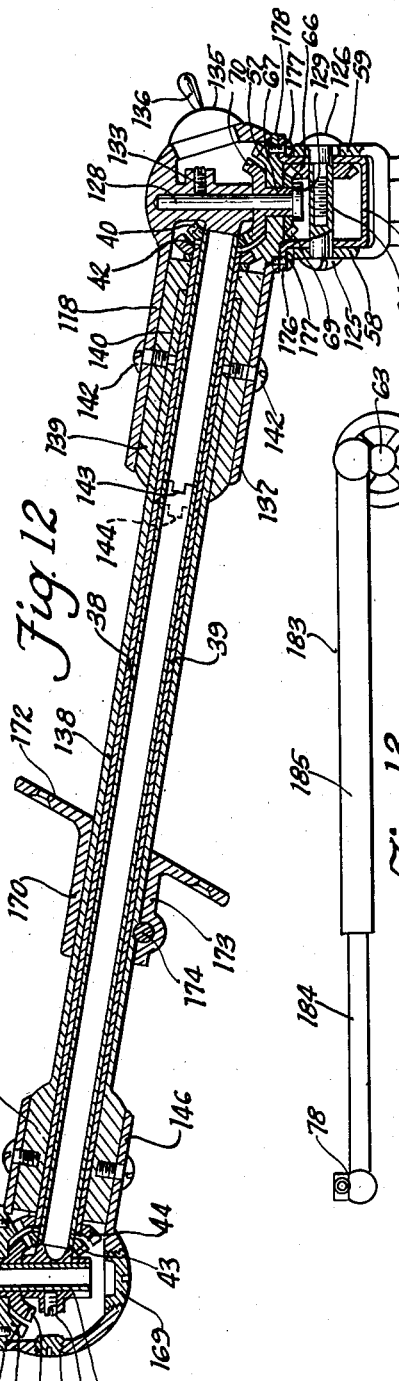
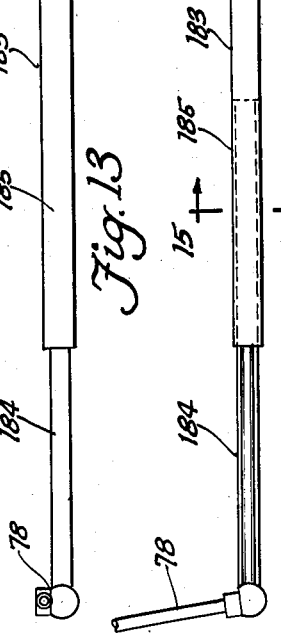
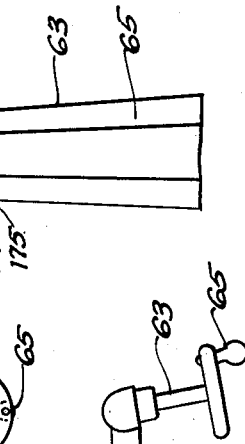
INVENTOR.
Fred S. Boyer
BY Albert G. McCaleb
Att'y

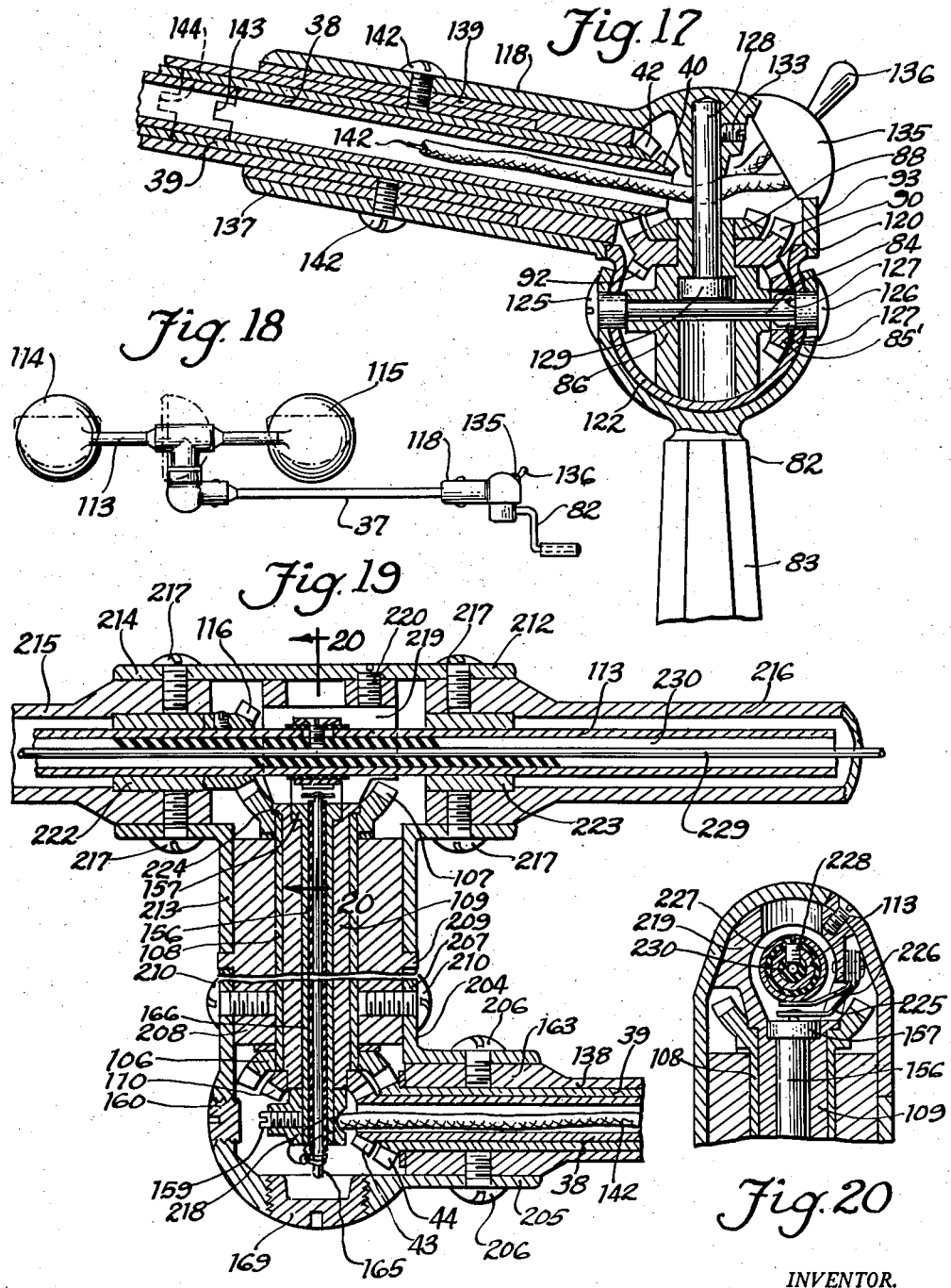

Patented Nov. 4, 1952

2,616,306

UNITED STATES PATENT OFFICE 2,616,306

CONTROL MECHANISM

Fred S. Boyer, Chicago, Ill.

Application April 6, 1949, Serial No. 85,918

10 Claims. (Cl. 74—491)

This invention relates to control mechanisms, and more particularly to mechanisms for interconnecting separated controlling and controlled elements in a manner such that substantially universal controlling or positioning movements imparted to the controlling element are transmitted to, and followed by the controlled element.

One of the objects of my invention is to provide a control mechanism in which two separate and independently operable motion transmitting elements are actuated by a single controlling part, each in accordance with one of two transverse planes of motion of the controlling part, for imparting like movements to a controlled part separated in position from the controlling part.

Another object of the invention is to provide a control mechanism which is subject to versatility of design and construction for determining the normal angular positions of controlling and controlled parts in reference to intervening motion translating parts, so as to provide for mounting and operation at a wide variety of angles and positions.

My invention further has within its purview the provision of a remote control mechanism adapted to substantially universal adjustment of the angular position of a controlled part, within a wide range of angles, by the similar angular adjustment of a controlling part.

In a control mechanism of the type referred to, it is a further object of my invention to provide motion transmitting elements of a character which avoids the necessity of indirect compound movements in two planes for reaching certain angular positions.

As another object, the invention comprehends the provision of a control mechanism adapted to the provision of universal position adjustment within a wide range and suited to enclosure within a housing having a stationary mid-portion between the controlling and controlled parts.

It is a further object of my invention to provide a remote control mechanism having a mid-portion between the controlling and controlled parts which is extensible and retractable, between limits, to adjusted lengths.

My invention also has within its purview the provision of a remote control mechanism adapted to a wide variety of uses, including that of adjusting the position of a spotlight or the like.

In the disclosed control mechanism, I have further provided a structure adapted to ease of installation with respect to a supporting structure, as well as to ease of operation, and durability.

Other objects and advantages of the invention will be apparent from the following description and the accompanying drawings in which similar characters of reference indicate similar parts throughout the several views.

Referring to the five sheets of drawings,

Fig. 1 is a diagrammatic side elevational view which depicts the structure and arrangement of a preferred form of this invention;

Figs. 2, 3 and 4 are respectively diagrammatic side elevational views, similar to Fig. 1, which illustrate different modifications of my control mechanism;

Fig. 5 is a side elevational view of a spotlight structure which is exemplary of an adaptation to which my control mechanism is adaptable;

Fig. 6 is a fragmentary end view taken substantially as indicated by a line 6—6 and accompanying arrows in Fig. 5;

Figs. 7 and 8 are respectively end sectional views taken substantially on lines 7—7 and 8—8 of Fig. 5 and looking in the directions indicated by accompanying arrows;

Figs. 9 and 10 are each fragmentary side views, partially in section, and drawn to an enlarged scale, which illustrate the internal structure of the spotlight shown in Fig. 5;

Fig. 11 is a fragmentary sectional view taken substantially on a line 11—11 of Fig. 10 and viewed in the direction indicated by the arrows;

Fig. 12 is a fragmentary side sectional view of a spotlight structure somewhat similar to that depicted in Fig. 5, but which embodies modifications of my control mechanism;

Figs. 13 and 14 are respectively side elevational and top plan views of a structure embodying another modification of my disclosed control mechanism;

Figs. 15 and 16 are end sectional views taken at a position such as that indicated by a line 15—15 in Fig. 14 and illustrating modifications of the disclosed structure;

Fig. 17 is a fragmentary side view, partially in section, which depicts a structural embodiment of one end of my control mechanism, as illustrated in Figs. 4 and 18;

Fig. 18 is a side elevational view depicting a structural adaptation of my control mechanism, as depicted in Fig. 4, to a double spotlight;

Fig. 19 is a fragmentary side sectional view illustrating an exemplary internal structure for the other end of the spotlight of Fig. 18 from that illustrated in Fig. 17 and Fig. 20 is a fragmentary sectional view taken substantially on a line 20—20 of Fig. 19 and in the direction indicated by accompanying arrows.

In the exemplary embodiment of my invention which is depicted in the accompanying drawings for illustrative purposes, I have not only shown my preferred form and various modifications of the control mechanism per se, but I also illustrated the structural adaptation of my control mechanism to remotely adjustable spotlights. While the illustrated adaptations of the invention are associated with spotlight structures, it will be readily apparent that my control mechanism has many additional adaptations for remotely adjusting, or effecting movements of a controlled part through a substantially universal range of angular positions within predetermined limits and in response to similar adjustments and/or movements of a controlling element.

Having reference to the control mechanism depicted in Fig. 1, a controlled part, for illustrative purposes, comprises a manually operable handle 25, at one end of which is a yoke 26 which carries a shaft 27, which shaft extends laterally across the yoke in a direction transverse to the axis of the handle. The shaft 27 is journalled in a bearing 28 and has a bevel gear 29 mounted at one end thereof and drivingly secured to the yoke. A spacing collar 30 which is secured to the shaft 27 locates the shaft and handle in one direction relative to one end of the bearing. A second shaft 32 is secured to, and extends from the bearing 28 in a direction laterally to the axis of that bearing. This second shaft has a bevel gear 33 secured to the end thereof opposite the bearing 28 and disposed in concentric relationship with respect to the axis of the shaft 32, as well as being in a general plane which is substantially parallel to the axis of the shaft 27. A bevel gear unit 34 has two sets of teeth 35 and 36 in angularly opposed relationship and is mounted for rotation on the shaft 32 between the bevel gear 33 and the bearing 28. The bevel gear 29 on the shaft 27 is in mesh with the teeth 36 of the bevel gear unit 34, while the teeth 35 of that gear unit preferably are in adjacent relationship to the teeth of the gear 33.

From the description thus far, it may be observed that when the handle 25 is turned about its axis, it not only rotates the shaft 32, and with it the gear 33, but also turns both gear portions of the bevel gear unit 34, by virtue of the meshing relationship of the gear 29 and teeth 36. Furthermore, when the handle 25 is swung rotationally about the axis of the shaft 27, without being turned about the axis of the shaft 32, the bevel gear 33 remains stationary, while the bevel gear unit 34 is rotated about the axis of the shaft 32 by the gear 29. While the term "bevel gear" is used herein to refer to the types of gears utilized in the preferred embodiment of my invention, it is understood that other forms of gears might be utilized to accomplish like purposes with similar general arrangements of parts.

The parts thus far referred to comprise a controlling ensemble. In the preferred embodiment of my invention which is depicted in Fig. 1, additional mechanism, including an intermediate drive 37, is utilized for translating movements from the controlling mechanism to a controlled mechanism, in a manner such that movements of the controlling part or handle are reflected in corresponding and similar movements of a controlled part. In the disclosed structure, the intermediate drive mechanism 37 has coaxial and relatively rotatable shafts 38 and 39; the shaft 39 being tubular and having the shaft 38 journalled therein for rotation, as well as extending therethrough so as to project beyond the shaft 39 at both ends. At one end, the shaft 38 has a bevel gear 40 drivingly secured thereto which meshes with the gear 33 of the controlling mechanism. Adjacent the gear 40, and drivingly secured to the end of the shaft 39 is a bevel gear 42 which meshes with the teeth 35 of the bevel gear unit 34. With this arrangement of parts, rotation of the handle 25 about the axis of the shaft 32 effects corresponding rotation of both shafts 38 and 39 of the intermediate drive mechanism, while movement of the handle about the axis of the shaft 27 produces rotation of the shaft 39, while the shaft 38 is held stationary.

It is to be understood that while the shafts 38 and 39 are depicted in their conventional form and as being substantially straight, they could, for similar purposes, be of the flexible type, or could be varied otherwise as, for example, by having the end portions thereof segregated and operatively connected by pulleys and belts or the like. Gears 43 and 44 are preferably like the gears 40 and 42 respectively, and are secured to the opposite ends of the shafts 38 and 39. For effecting the controlled movement, or determining the position of a controlled part 45 by the actuation of the handle 25, with the mechanism disclosed, that controlled part 45 is preferably connected to the gears 43 and 44 through a controlled gear mechanism which is substantially like, and in opposed relationship to the controlling mechanism. That is, the controlled part has a yoke 46 secured thereto which carries a lateral shaft 47. The shaft 47 is journalled in a bearing 48 and has a bevel gear 49 mounted on one end thereof which is drivingly connected to the yoke 46. At the end opposite the bevel gear, the shaft 47 is located endwise within the yoke by a spacing collar 50. A shaft 52 projects from the exterior of the bearing 48 in substantially perpendicular relationship to the axis of the shaft 47 and has a bevel gear 53 secured to the end thereof opposite the bearing. The gear 53 meshes with the gear 43 of the intermediate driving mechanism. Also, a bevel gear unit 54 has two sets of teeth 55 and 56 in angularly opposed relationship and is mounted for rotation on the shaft 52 between the bearing 48 and gear 53. The gear 49 on the shaft 47 is in mesh with the teeth 56 of the bevel gear unit 54, while the teeth 55 thereof mesh with the gear 44 on the shaft 39.

As previously described, rotation of the handle 25 in one plane and about the axis of the shaft 32 effects rotation of both of the gears 40 and 42, as well as the shafts 38 and 39 and the gears 43 and 44. This, in turn, produces like rotation of the gear 53 and bevel gear unit 54 about the axis of the shaft 52 to rotate the controlled part 45 about the same axis, so that the controlled part 45 is driven in a manner corresponding to the movement of the controlling part. With gears of like size providing the similar ratios at both ends of the intermediate driving mechanism, the movements correspond in extent, as well as in direction. On the other hand, swinging movement of handle 25 about the axis of the shaft 27 rotates the gear 42 and shaft 39 while the gear 40 and shaft 38 remain stationary. This movement actuates the bevel gear unit 54 so as to move the controlled part about the axis of the shaft 47 in a direction and to an extent corresponding to the movement of the controlling part. The shafts 27 and 32 and the shafts 47 and 52 being transversely disposed in similar angular relationships, the movements of the controlling and controlled parts about the axes of those shafts are substantially universal within the limits of the movements of the controlling and controlled parts.

In the modified forms of my invention which are illustrated in Figs. 2, 3 and 4, reference characters like those used in the description of the structure shown in Fig. 1 will be utilized to designate similar parts which perform corresponding functions. Also, to impart an understanding of the modifications, with brevity, the description of the disclosed modifications will be devoted mainly to the differences of structure and operation from those previously set forth with respect to the structure of Fig. 1.

In the modified structure disclosed in Fig. 2, for example, the intermediate driving mechanism is like that disclosed and described in respect to Fig. 1. The controlling and controlled parts, however, are modified. In the controlling part, a bevel gear 57 has spaced and substantially parallel projecting lugs 58 and 59 secured thereto to form a yoke and provide aligned bearings 60 and 62 in which a controlling part 63 having a shaft portion 64 and a handle portion 65 is mounted for rotational movement. The handle portion 65, in the disclosed structure, is at one end of the shaft portion 64 and is disposed outside of the lug 59. Between the lugs 58 and 59, a bevel gear 66 is drivingly secured to the shaft portion 64. Centrally of the bevel gear 57, and in coaxial relationship therewith, a shaft 67 extends through a bearing 68 in that gear and has bevel gears 69 and 70 secured to its opposite ends. The bevel gear 69 is in mesh with the bevel gear 66 on the controlling part 63, while the bevel gear 70 is in mesh with the bevel gear 40 on the shaft 38. The bevel gear 57 meshes with the bevel gear 42 on the shaft 39. In this structure, swinging movement of the controlling part 63 about the axis of the shaft 67 drives both of the bevel gears 57 and 70 so as to turn both shafts 38 and 39. Rotation of the controlling part 63 about the axis of its shaft portion 64 drives the bevel gears 69 and 70 at the opposite ends of the shaft 67 and turns only the shaft 38 of the intermediate drive mechanism.

At the opposite end of the intermediate drive mechanism, and as in the previous instance, the controlled part is actuated by a mechanism similar in structure and in opposed relationship to that of the controlling mechanism. That is, the gear 43 meshes with a bevel gear 72, which latter gear is secured in concentric relationship to the end of a shaft 73. Another bevel gear 74 is secured to the opposite end of the shaft 73 in concentric and parallel relationship to the gear 72. Also, a bevel gear 75 is journalled for rotation on the shaft 73 between the bevel gears 72 and 74, and is in mesh with the bevel gear 44 of the intermediate drive mechanism. On the face of the gear 75 opposite the beveled teeth, substantially parallel and separated lugs 76 and 77 are secured thereto and project therefrom. These lugs rotatably support a controlled part 78 having a shaft portion 79. In the disclosed structure, the controlled part 78 is in the form of a yoke which is adapted to carry an element which is to be moved and have its position determined by operation of a handle 65. A bevel gear 80 meshes with the gear 74 and is drivingly secured to the shaft portion 79 to control the rotational movement of the controlled part about the axis of that shaft portion.

In the modified form of the invention which is disclosed in Fig. 3, the structures of the controlling and controlled parts, as well as that of the gears applied to one end of the intermediate driving mechanism are varied to effect a change of the relative positions of the controlling and controlled parts with respect to the intermediate driving mechanism without altering the similarity of the controlling and conrolled movements of the parts. In the controlling mechanism, a controlling part 82 has a handle portion 83 at one end of a shaft portion 84, and a bevel gear 85 is secured to the other end of the shaft portion. Intermediate the handle portion and bevel gear, the shaft portion is journalled for rotational movements in a bearing 86, which bearing is secured in transverse relationship to one end of a shaft 87. At its other end, the shaft 87 has secured thereto a bevel gear 88 disposed in a plane substantially parallel to the axis of the bearing 86. The bevel gear 88 is in mesh with a bevel gear 89 which is secured to one end of the shaft 39 of the intermediate driving mechanism. Intermediate the bearing 86 and the gear 88, a bevel gear unit 90 is journalled for rotation on the shaft 87. This bevel gear unit has two sets of teeth 92 and 93 in angularly opposed relationship; the teeth 92 thereof being in mesh with the gear 85 on the controlling part, and the teeth 93 being in mesh with a bevel gear 94 on the end of the shaft 38 of the intermediate driving mechanism.

In addition to the variation of the positions of the controlling and controlled parts relative to the intermediate driving mechanism, the structure of Fig. 3 also adapts a gearing for those parts, which is similar to that of Fig. 1, to actuation of controlling and controlled parts quite like those illustrated in Fig. 2. In the controlled mechanism, a bevel gear 95 is in mesh with the gear 43 on the end of the shaft 38 and has secured thereto in concentric relationship a shaft 96 which projects from one face thereof. At the end of the shaft 96 opposite the gear 95, a gear 97 is secured to the shaft with a plane of rotation substantially parallel to the general plane of the gear 95. Intermediate the gear 97 and gear 95, a bevel gear unit 98 is journalled for rotation on the shaft 96 and has teeth 99 which mesh with the bevel gear 44 on the end of the shaft 39 of the intermediate driving mechanism. On the face of the gear unit 98 opposite the bevelled teeth, it has separated lugs 100 and 101 secured thereto and projecting therefrom. These lugs rotatably support a controlled part 104 having a shaft portion 103. A bevel gear 102 is drivingly secured to a shaft portion 103 of the controlled part 104 to rotate the shaft portion 103 of the controlled part in response to rotation of the shaft 38 and gear 43.

In respect to this form of the invention, it may be observed that rotational movement of the controlling part 82 about the axis of the shaft portion 84 thereof effects rotation of the gear 85, gear unit 90, and gear 94 to produce rotational movement of the controlled part 104 in the same direction through the action of the gear 43, gears 95 and 97 and gear 102. Also, rotational movement of the controlling part 82 about the axis of the shaft 87 turns both the gear unit 90 and gear 88 to rotate both shafts of the intermediate driving mechanism and thereby turns the driven part 104 about the axis of the shaft 96 in a direction corresponding to the movement of the controlling part.

In the mechanism disclosed in Fig. 4, the intermediate driving mechanism is like that depicted in Figs. 1 and 2 and the controlling mechanism is similar to that illustrated in Fig. 3, except that the position thereof with respect to the intermediate driving mechanism is changed and the bevel gear 85' is reversed in its position on the shaft portion of the controlling part, as the result of the change of the positions of the controlling mechanisms between Figs. 3 and 4. In Fig. 4, the rotational movement of the controlling part about the axis of the shaft 87 drives the gear 40 on the end of the shaft 38; while rotation of the controlling part about the axis of its shaft portion 84 drives the shaft 39 through the gear 85', gear unit 90 and gear 42.

The controlled mechanism in this form, on the other hand, is depicted in a form indicating a manner of extending the parts thereof to effect an elongation adapted to uses in determining the positions or effecting movements of a different type of controlled part or parts. As illustrated, a bevel gear unit 105 has bevel gear portions 106 and 107 in substantially parallel relationship and having thereon teeth in angularly opposed relationship at the opposite ends of a bearing sleeve 108. A shaft 109 extends through and is journalled for rotation in the bearing sleeve 108. At one end, a bevel gear 110 is secured to the shaft, while at the other end a bearing 112 is secured to the shaft with its bearing axis substantially parallel to the plane of the gear 110. A cross shaft 113 is journalled for rotation in the bearing 112 and projects from the opposite ends of the bearing for carrying parts, such as spotlights 114 and 115. A bevel gear 116 is drivingly secured to the shaft 113 and meshes with the gear portion 107 of the gear unit 105. The gear 106 and the gear 110 mesh with the gears 44 and 43 respectively of the intermediate driving mechanism.

With this combination, swinging movement of the controlling part 82 about the axis of the shaft 87 effects rotation of both the shafts 38 and 39 of the intermediate driving mechanism and thereby turns the shaft 113 and its supported parts, such as the lights 114 and 115, about the axis of the shaft 109. Rotation of the controlling part 82 about the axis of its shaft portion 84 turns only the shaft 39 of the intermediate driving mechanism, and thereby rotates the controlled shaft 113 about its axis by the rotation of the gear unit 105 and bevel gear 116.

With this basic understanding of the control mechanism of my invention and certain of its possible variations for adapting it to different purposes or environments, structural embodiments and exemplary adaptations thereof to the control of a spotlight or the like will be explained with reference to the additional figures of the drawings for illustrative purposes. For example, the basic control mechanism of Fig. 1, although suited to other uses, is depicted in Figs. 5 to 11 inclusive in its adaptation to the remote control of a spotlight of the type in which the intermediate driving mechanism extends through the body or windshield of an automobile, boat or the like, so that the controlling part is handy to an operator and the light is at an exterior position suited to effective use.

Referring in detail to the structural embodiment of my invention which is illustrated in Figs. 5 to 11, the controlling mechanism is enclosed within a housing 117 which includes an upper portion 118 and a lower cup portion 119; the lower cup portion 119 having a margin movably adjoining the upper portion 118 and overlapped by a flange 120 on that upper portion to provide a substantially dust proof enclosure. The lower cup portion 119 is fitted between the sides of the yoke 26 at the end of the handle 25 and encloses the bearing 28 and bevel gear 29. This lower cup portion is secured to the bearing 28 by fastening means, such as a screw 122 and has aligned side openings 123 and 124 through which the shaft 27 extends; the shaft 27, in this instance, having a head 126 at one end and being threaded at its opposite ends to receive a screw cap 125. The shaft 27 is also keyed to the bevel gear 29 as indicated at 127, so that rotational movement of the handle 25 about the axis of the shaft 27 effects corresponding rotational movement of the bevel gear 29 and turns the shaft relative to the bearing 28. In the form shown, the shaft 32 is tubular and projects laterally from the upper side of the bearing 28. This shaft has the bevel gear unit 34 journalled thereon and also has the bevel gear 33 secured thereto.

In the structural form disclosed, a stud 128 extends through the hollow shaft 32 and has a head portion 129 disposed within a cylindrical recess 130 in the bearing 28, which recess is concentric with respect to the hollow shaft 32 and extends laterally across the shaft 27. This stud extends into an internal boss 132 in the upper housing portion 118 and is secured therein by fastening means such as a set screw 133, so that when thus secured it serves to provide a supporting connection between the two housing portions and the parts of the controlling mechanism carried by the bearing 28 and shaft 32. An opening 134 is provided at one end of the upper housing portion 118 through which access is provided to the set screw 133 for effecting the assembly and disassembly of the upper and lower portions of the controlling mechanism. The opening 134 provides a convenient mounting seat for a switch 135 to support that switch at a convenient position for operating its actuating lever 136, and the switch provides a convenient closure cap for the opening. It may be readily understood that when the set screw 133 is loosened, the assembly, including the stud 128, shaft 32, bearing 28, bevel gear 33, bevel gear unit 34, bevel gear 29, cross shaft 27, the cap portion 119 of the housing and the handle 25, may be assembled or disassembled with respect to the upper housing portion 118.

Opposite the opening 134, and in angular relationship with respect to the axis of the shaft 32 and stud 128, the upper housing portion 118 is provided with a projecting and substantially cylindrical sleeve portion 137 which serves as a supporting connection between the controlling mechanism and a tubular housing 138 which preferably encloses the shafts 38 and 39 of the intermediate driving mechanism. For purposes of assembly and disassembly, a filler sleeve 139 is removably mounted in the sleeve portion 137 of the upper housing portion 118. This filler sleeve has a counterbore 140 which snugly fits the end portion of the tubular housing 138; the upper housing portion 118, filler sleeve 139 and tubular housing 138 being normally held in assembled relationship by fastening means, such as set screws 142. At its inner end, the filler sleeve 139 has a plane surface which provides an abutment for the gear 42 which is secured to the shaft 39 of the intermediate driving mechanism. Adjacent the bevel gear 42, the bevel gear 40 is secured to a projecting end of the inner shaft 38 of the intermediate driving mechanism.

As disclosed, both the shafts 38 and 39 of the intermediate driving mechanism are hollow, in order to provide an internal passage for an insulated conductor 142 extending from the switch 135 to the illuminating element (not shown) of the spotlight which comprises the controlled part 45 in this embodiment. The shaft 39 is journalled for rotation within the housing 138 and the end portion of the filler sleeve 139, while the shaft 38 is journalled for rotation within the shaft 39. The opening through the inner shaft 38 is of a size sufficient that it provides for free rotation of that shaft relative to the insulated conductor 142. For convenience in mounting the control mechanism relative to a supporting structure, it is my preference to divide the shafts 38 and 39 into separable portions by notched cuts 143 and 144 respectively (Fig. 9), whereby the controlling and controlled ends of the complete assembly may be separated without the necessity or disassembling either the controlling or controlled assemblies thereof.

In the assembled relationship of the parts of the controlling mechanism, as depicted in Fig. 9, the bevel gear 29 meshes with the teeth 36 of the bevel gear unit 34, while the teeth 35 of that unit are in mesh with the bevel gear 42 on the shaft 39, so that swinging movement of the handle 25 about the axis of the shaft 27 effects rotation of the shaft 39. Also, rotation of the handle 25 relative to the axis of the stud 128 drives the bevel gears 33 and 40 to turn the shaft 38; it being understood that the bevel gear unit 34 and bevel gear 42 turn therewith, as the result of the engagement between the bevel gear 29 and the teeth 36 of the bevel gear unit.

Referring now to the control mechanism illustrated in Figs. 5, 10 and 11, with the internal structure depicted in the latter two figures, that mechanism is enclosed within a housing 145 which includes a lower housing portion 146 and an upper cap portion 147; the cap portion 147 having a marginal edge overlapped by a flange 148 on the lower housing portion to provide a movable and substantially dust proof connection therebetween. The controlled part 45, in this instance, comprises a spotlight or the like having a casing 149 secured to the yoke 46. The upper cap portion 147 of the housing is mounted between the side portions of the yoke 46. The shaft 47 has a head 150 at one end and extends through the side portions of the yoke 46, and the opposite sides of the cap portion 147, is journalled in the bearing 48 and is provided with a screw cap 152 to hold it in place. Additionally, the shaft 47 is drivingly connected by keys 153 to the bevel gear 49, as well as being keyed to one side of the yoke 46 at 154.

Integrally formed on the bearing 48 and projecting laterally from the mid-portion thereof is the shaft 52 which, in addition to being hollow, has the bevel gear unit 54 journalled for rotation thereon. Also, at the end of that shaft, the bevel gear 53 is secured thereto. The teeth 56 of the bevel gear unit mesh with the bevel gear 49 so that rotation of that gear unit actuates the bevel gear 49 to turn the driven part about the axis of the shaft 47. The assembly, comprising the bearing 48, bevel gear unit 54 and bevel gear 53 is supported relative to an internal boss 155 in the lower housing portion 146 and held in assembled relationship relative to the boss by a hollow stud 156 which extends through the shaft 52 and the boss 155. At its upper end, the stud 156 has a head 157 mounted within a counterbore 158 in the bearing 48. The stud 156 is held in position relative to the boss 155 by fastening means, such as a set screw 159; the set screw being accessible from the exterior of the lower housing portion by removal of a screw plug 160 in the wall of that lower housing portion.

The lower housing portion 146 has a projecting sleeve portion 162 by which it is detachably connected to the end of the intermediate driving mechanism. Internally of that sleeve portion, a filler sleeve 163 of a diameter larger than the bevel gears 43 and 44 is mounted to facilitate the assembly and disassembly of the structure. Although this filler sleeve might be a separate part, it is shown, in the present instance, as being integrally formed upon the end of the tubular housing 138. The shafts 38 and 39 are journalled for relative rotation within the filler sleeve 163 as well as the housing 138. In my preferred structure, the sleeve portion 162 of the lower housing portion is split along one side and is provided with a clamping screw 164, by which the filler sleeve is locked in place relative thereto. At its inner end, the filler sleeve has a substantially plane surface which serves as a seat for one end of the bevel gear 44 which is secured to the outer shaft 39. Adjacent the gear 44, the bevel gear 43 is secured to the inner shaft 38.

The insulated conductor 142 which extends through the hollow inner shaft 38 connects to a pin 165 which extends through the hollow stud 156 and is insulated therefrom by an insulating sleeve 166. The other end of this pin engages a resilient contact spring 167, as illustrated in Fig. 11, and thereby makes a connection to an insulated lead wire 168 which, in turn, extends to the illuminating element of the light. Access to the connection between the pin and the insulated wire 142 is provided for by a removable screw plug 169 at the bottom of the housing portion 145.

From the description of this structural embodiment of my invention, as well as by reference to the description referring to Fig. 1, it may be readily understood that rotational or swinging movement of the handle 25 about the axis of the shaft 27, as indicated by dot and dash lines at 25a in Fig. 5, produces rotational movements of the controlled part about the axis of the shaft 47 whereby the angular position of the light housing may be varied, as illustratively shown in dot and dash lines 149a, 149b and 149c in Fig. 5. Also, it may be readily understood that rotation of the handle 25 about the axis of the stud 128 turns the controlled part about the axis of the stud 156.

For mounting purposes relative to the windshield or the like, it is my preference to provide a flanged collar 170 which has a plane surface 172 adapted to be secured against the mounting surface and which includes a clamping portion 173 adapted to be tightened relative to the exterior of the tubular housing 138 at a desired position by a clamping screw 174, as shown in Fig. 5.

In the modified form of my invention which is depicted in Fig. 12, the control mechanism is substantially like that illustrated in Fig. 2, with parts bearing reference numerals similar to those used in Fig. 2 being for like purposes. Also, the housing and structure of the intermediate driving mechanism is substantially like that described in connection with Figs. 2 and 5 to 11 inclusive, so that parts bearing reference numerals similar to those referred to in such structure are substantially alike. Also, except for the differences of the housings and mechanisms of the controlling and controlled parts which will be particularly pointed out, those illustrated in Fig. 12 are substantially like those of Figs. 5 to 11 inclusive and bear like reference numerals. Generally speaking, the structure of Fig. 12 varies from that depicted in Figs. 5 to 11 inclusive in respect to the angular dispositions of the controlling and controlled parts with respect to the axis of the intermediate driving mechanism. Other than this, there are certain structural changes in the housings of the controlling and controlled portions, in order to adapt the housing structure to the changes of gearing which exists between the modified forms of Figs. 1 and 2.

Having particular reference to the more detailed differences of structure of the modification shown in Fig. 12 from those previously described, it is to be noted that a lower cup portion 175 of the housing for the controlling mechanism has a peripheral end flange 176 which is secured to one face of the bevel gear 57 by fastening means, such as screws 177. Also, a flange 178 is provided on a peripheral portion of the gear 57, which flange overlaps a part of the upper housing portion 118 to establish a substantially dust proof joint between the upper and lower housing portions. This same structural distinction applies to the housing of the controlled mechanism, wherein an upper cup portion 178 of the housing has a peripheral end flange 179 secured to the gear 75 by fastening means, such as screws 180; the gear 75 having a flange 182 thereon which overlies and provides a substantially dust proof seal with the lower housing portion 146.

Having the aforementioned differences and similarities between this and the previously described structures in mind, it may be readily understood that rotation of the handle 65 about the axis of the stud 128 turns the bevel gear 57 to actuate the bevel gear 42 and drive the outer shaft 39 which, in turn, turns the bevel gear 44 to actuate the bevel gear 75, thereby turning the controlled part relative to the axis of the stud 176 and in the same direction as the handle rotation. On the other hand, rotational movement of the handle about the axis of the shaft 64 turns the bevel gear 66 to actuate the connected gears 69 and 70 relative to the stud 128, thereby to turn the inner shaft 38 of the intermediate drive mechanism. Such rotation of the inner shaft turns the bevel gear 43, connected gears 72 and 74 and rotates the bevel gear 80 to move the controlled part about the axis of the shaft 79. In this instance, it may be observed that the movements effected by the rotations of the inner and outer shafts of the intermediate driving mechanism are reversed. This factor becomes of importance in instances in which movement in one plane requires the transmission of greater torque than movements in the other plane, and it is desired to utilize the larger outer shaft to transmit the greater torque.

In the modifications of my invention which are depicted in Figs. 13 to 16, a control mechanism substantially of the type shown in Fig. 2 is adapted to the inclusion of an extensible shaft and housing in the intermediate driving mechanism. In this form of the invention, an intermediate drive housing 183 has telescopically engaged sections 184 and 185. As a practical matter, these housing sections may be of either polygonal section or splined to prevent relative rotation between the engaged sections, while permitting their relative extension or retraction. As depicted in Fig. 15, the larger housing section 185 has longitudinal channels 186 and 187 therein which respectively receive exterior splines 188 and 189 on the smaller housing section 184. In like manner, an outer shaft 190 has a circular exterior surface journalled for rotation with the housing and is composed of an outer, longitudinally channelled shaft section 192 which slidably receives a splined inner shaft section 193. Also, an inner shaft 194 includes a shaft section 195 having a circular outer surface and a channelled inner surface, and slidably receives a shaft section 196 which is splined to fit within the shaft section 195. The larger and smaller shafts, in this instance, serve the same purpose as the larger and smaller shafts 39 and 38, respectively, of Fig. 2, except that in the present instance the shafts and housing of the intermediate driving mechanism may be adjusted in length to meet particular requirements.

In the modification illustrated in Fig. 16, housing sections 197 and 198 are polygonal and telescopically slidable relative to one another. Within this housing, an outer shaft includes telescopically engaging shaft sections 199 and 200. The outer surface of the larger shaft section 199 is circular, so that it is rotatable within the housing. The adjacent surfaces of the two shaft sections 199 and 200 are splined to prevent relative rotation therebetween, and the inner surface of the smaller shaft section is circular to provide a bearing surface for the inner shaft. An inner shaft comprises telescopically engaging and longitudinally slidable shaft sections 202 and 203; the latter sections being of polygonal section to prevent relative rotation therebetween.

Figs. 17 to 20 illustrate a structural embodiment of the modification of my invention shown in Fig. 4. As illustrated in Fig. 17, the controlling mechanism of the ensemble, except for the precise contours of a few of the parts, is substantially like that illustrated and described with respect to Fig. 9. The structure and operation of the controlling mechanism, as illustrated in Fig. 17, may be readily understood by reference to the description of the housing structure for Fig. 9 and the description of the gearing for Fig. 4; the reference numerals applied to Fig. 17 correspond to those of Figs. 4 and 9 and refer to like parts which perform similar functions, in each instance.

Although the particular type of actuating handle illustrated in Fig. 18 differs from that of Fig. 17, Fig. 18 presents a general exterior view in side elevation of the complete structure of the type depicted in greater detail and to a larger scale in Figs. 17, 19 and 20.

The internal and housing structures of the control mechanism are shown in Figs. 19 and 20. In these figures, as in the others, reference numerals similar to those used in the description of Figs. 4 and 10 refer to similar parts to perform like functions. First considering the housing structure, a substantially L-shaped lower housing portion 204 has a part 205 which receives the enlarged end portion 163 of the housing 138 and which is secured thereto by fastening means, such as screws 206. An angularly disposed part 207 of the lower housing portion receives and has secured therein a bearing insert 208 having a peripheral flange 209 which abuts the end of that part for locating purposes, and is secured in place by fastening means, such as screws 210. An upper and substantially T-shaped housing portion 212 has a stem part 13 which fits over and is rotatable relative to the upper part of the bearing insert 208 about the flange 209. Also, a cross portion 214 of this substantially T-shaped upper housing portion receives and carries at its opposite ends tubular housing arms 215 and 216 which are secured thereto by fastening means such as screws 217 and project in opposed directions therefrom. Internally of the lower housing portion 204, an integrally formed boss 218 provides one supporting element. Internally of the upper housing portion 212 a bearing block 219 is secured in place by fastening means, such as screws 220, and bearing inserts 222 and 223 are secured in the adjacent ends of the housing arms 215 and 216 respectively to furnish additional support for the operating parts of the mechanism.

Within the lower housing portion 204, the shafts of the intermediate driving mechanism are supported substantially as described in connection with the other modifications. In addition, the tubular shaft or bearing sleeve 108 of the elongated bevel gear unit is journalled for rotation in the bearing insert 208, with the bevel gear portion 106 at one end thereof and the bevel gear portion 107 at the other end thereof. Internally of the bearing sleeve 108, the hollow shaft 109 is journalled for rotation. At its upper end, the shaft 109 has a locating shoulder 224, while at its other end, the shaft carries the bevel gear 110. As in the other described forms, the hollow stud 156 has a head portion 157 and is secured in position relative to the boss 218 in the lower housing portion 204 by a set screw 159 to hold the intermediate operating parts of the control mechanism in their assembled relationship.

At the upper part of the control mechanism, the cross shaft 113 is journalled in the bearing inserts 222 and 223 and extends to the ends of the housing arms 215 and 216 to carry the controlled parts, such as lights 114 and 115. The bevel gear 116 is secured to the shaft 113 and meshes with the bevel gear 107, so that rotation of the bevel gear unit, including the bearing sleeve 108 and bevel gear 106, by rotation of the shaft 39 of the intermediate driving mechanism produces rotational movement of the shaft 113 about its longitudinal axis. The bearing block, on the other hand, is either secured to or is an integral part of the shaft 109, so that rotation thereof through the bevel gears 110 and 43 and rotation of the shaft 38 of the intermediate driving mechanism swings the entire upper portion of the controlled mechanism about the axis of the shaft 109.

For making electrical connections to the controlled parts, the insulated lead wire 142 extends through the hollow inner shaft of the intermediate control mechanism and is connected to a projecting end of the pin 165 which extends through and is electrically insulated from the hollow stud 156. At its upper end, this pin engages a contact spring 225 and thence makes contact through a spring 226 with an insulatingly supported ring 227 and a screw 228 with a conductor 229, which latter conductor extends to the controlled parts and is separated by insulation 230 from the shaft 113.

From the foregoing description and reference to the accompanying drawings, it may be readily appreciated that my disclosed control mechanism provides for the substantially universal movement and positioning of a controlled part, within limits, by movements in transverse planes corresponding to the movements of a controlling part. It further provides for selective and independent movements in transverse planes by a mechanism which is compact and capable of enclosure. Also, my disclosed remote control mechanism, as illustrated, is susceptible to modifications and variations adapting it to a large variety of uses.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A control mechanism comprising, in combination, controlling and controlled parts each including a shaft portion providing an axis of rotational movement and having a first bevel gear drivingly secured to the shaft portion, means providing bearings rotatably supporting the shaft portions of the controlling and controlled parts, each of said means having a second bevel gear drivingly secured thereto and disposed in a plane transverse to the plane of the first bevel gear in each instance, a third bevel gear unit for each of the controlling and controlled parts and supported for rotation independently of the second bevel gear, said third bevel gear unit in each instance having coaxial gear parts presenting concentric and axially spaced teeth in angularly opposed relationship and disposed in planes parallel to the plane of the associated second bevel gear, one of the gear parts of each of the said third bevel gear units being in mesh with one of the first bevel gears, and intermediate driving means including bevel gears at opposite ends, one of which latter mentioned bevel gears at each end of the driving means is in mesh with the second bevel gear and the other of which is in mesh with the gear part other than said one on the third bevel gear unit.

2. A control mechanism as defined in claim 1, and wherein said intermediate driving means comprises concentric and independently rotatable shafts.

3. A control mechanism as defined in claim 1, and wherein said means providing bearings for the shaft portions and said second bevel gears of each of the controlling and controlled parts are separated axially of one another and have an intervening connecting shaft providing a bearing journalled in the third bevel gear unit.

4. A control mechanism as defined in claim 1, and wherein said intermediate driving means embodies telescopically extensible shafts connecting the bevel gears at the opposite ends thereof.

5. A control mechanism as defined in claim 1, and wherein said controlling part comprises a manually operable handle, and said bevel gears and intermediate driving means are inclosed in a housing having adjoined parts.

6. In a control mechanism, the combination at each end of an intermediate driving mechanism comprising a supporting structure, transversely disposed shafts carried in adjacent relationship by the supporting structure, a movable part supported relative to said supporting structure by said shafts for rotational movement in transverse planes relative to the axes of the shafts, a first gear drivingly secured to the movable part and mounted for rotation relative to one of the shafts, a second gear drivingly secured to said movable part for rotational movement therewith and relative to the axis of the other of the shafts, and a gear unit mounted for rotation relative to the axis of said one of the shafts and having teeth in meshing relationship with the second gear, said gear unit also having additional teeth spaced from the first mentioned teeth thereof, said intermediate driving mechanism including separately rotatable shafts, each of which has gears at each of said opposite ends, and the gears at each of said opposite ends of the intermediate driving mechanism being drivingly meshed with said first gear and said additional teeth of the gear unit respectively.

7. A control mechanism comprising, in combination, controlling and controlled parts each including bevel gears mounted in transverse planes and having intersecting axes of rotation, and means supporting said gears of each part for rotation relative to their respective axes of rotation, intermediate driving means including additional bevel gears drivingly connected with the bevel gears of both the controlling and controlled parts and connected by motion transmitting elements, and an actuating member drivingly connected to each of the bevel gears of the controlling part in a manner such that movements of the actuating member in each of two transverse planes separately effects movements of the bevel gears connected thereto and thereby drives the gears of the intermediate driving means and controlled part, the bevel gears of the controlling and controlled parts being substantially alike, and the bevel gears of the controlled part being drivingly connected to a controlled element in a manner substantially like that in which the actuating member is connected to its bevel gears.

8. A control mechanism comprising, in combination, controlling and controlled parts each including bevel gears mounted in transverse planes and having intersecting axes of rotation, and means supporting said gears on each part for rotation relative to their respective axes of rotation, intermediate driving means including additional bevel gears drivingly connected with the bevel gears of both the controlling and controlled parts and connected by motion transmitting elements, and an actuating member drivingly connected to each of the bevel gears of the controlling part in a manner such that movements of the actuating member in each of two transverse planes separately effects movements of the bevel gears connected thereto and thereby drives the gears of the intermediate driving means including a gear at each end thereof meshing directly with one of the gears of each of the controlling and controlled parts and another gear at each end of the intermediate driving means which acts through an intervening gear unit for effecting a driving connection to the other of the gears of each of the controlling and controlled parts.

9. Apparatus for enabling intermediate drivers having the same type of movement and extending in the same direction to transmit angular movements about intersecting axes from a driving part to a driven part, said apparatus including a first device comprising a pair of members rotatable about a first axis and drivingly connected separately to the intermediate drivers, a pair of meshing bevel gears, means securing one bevel gear to one member coaxially therewith against rotation with respect thereto, means mounting the other bevel gear and the driving part for bodily movement with the other member about the first axis and for rotation with respect to the said other member about a second axis transverse to the first axis, and means securing the driving part to the said other bevel gear against rotation with respect thereto about the second axis, said apparatus further including a second device similar to the first device but with corresponding elements, but being associated with the intermediate drivers at a region spaced therealong from the first device and with the driven part instead of the driving part.

10. A drive unit comprising a first member formed of spaced gears and a first shaft joining the gears against rotation with respect to one another, one of the gears being a bevel gear, a third gear rotatably mounted on the shaft between the first mentioned gears and carrying lugs projecting on opposite sides of the bevel gear and therebeyond, a second shaft rotatably mounted in the lugs transverse to the first shaft so as to be bodily movable with the third gear about the first shaft, another bevel gear meshing with the aforementioned bevel gear and secured on the second shaft against rotation with respect thereto between the lugs, and a control part secured to the second shaft against rotation with respect thereto, both the said other bevel gear and the control part being rotatable with the second shaft about the latter as an axis.

FRED S. BOYER.

REFERENCES CITED

The following references are of record in the file of this patent:

UNITED STATES PATENTS

| Number | Name | Date |
|---|---|---|
| 501,415 | Garey | July 11, 1893 |
| 504,994 | Neller | Sept. 12, 1893 |
| 1,061,701 | Stumpf et al. | May 13, 1913 |
| 1,213,238 | Nickels | Jan. 23, 1917 |
| 1,284,818 | Toepfer | Nov. 12, 1918 |
| 1,448,791 | Coffeen | Mar. 20, 1923 |
| 1,833,574 | Hirsch | Nov. 24, 1931 |
| 2,431,290 | Wildermann | Nov. 18, 1937 |

FOREIGN PATENTS

| Number | Country | Date |
|---|---|---|
| 682,765 | Germany | Oct. 21, 1939 |